(12) United States Patent
Xu et al.

(10) Patent No.: US 12,532,258 B2
(45) Date of Patent: Jan. 20, 2026

(54) EXTENDED REALITY POWER SAVINGS ENHANCEMENTS

(71) Applicant: QUALCOMM Incorporated, San Diego, CA (US)

(72) Inventors: Huilin Xu, Temecula, CA (US); Yuchul Kim, San Diego, CA (US); Nicolas Cornillet, Lannion (FR); Yeliz Tokgoz, San Diego, CA (US); Jay Kumar Sundararajan, San Diego, CA (US); Hwan Joon Kwon, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 437 days.

(21) Appl. No.: 17/807,931

(22) Filed: Jun. 21, 2022

(65) Prior Publication Data

US 2023/0413173 A1 Dec. 21, 2023

(51) Int. Cl.
*H04W 52/02* (2009.01)
*H04L 1/1607* (2023.01)
*H04W 72/1273* (2023.01)
*H04W 72/23* (2023.01)

(52) U.S. Cl.
CPC ....... *H04W 52/0216* (2013.01); *H04L 1/1614* (2013.01); *H04W 72/1273* (2013.01); *H04W 72/23* (2023.01)

(58) Field of Classification Search
CPC ......... H04W 52/0216; H04W 52/0219; H04W 52/0229; H04W 52/0235; H04W 52/028; H04W 72/1273; H04W 72/23; H04L 1/1614; Y02D 30/70
See application file for complete search history.

(56) References Cited

U.S. PATENT DOCUMENTS

| 11,671,978 | B2 | 6/2023 | Xu et al. | |
| 2016/0028512 | A1* | 1/2016 | Papasakellariou | H04L 5/1469 370/330 |
| 2021/0195625 | A1* | 6/2021 | Xu | H04W 72/23 |
| 2022/0174706 | A1* | 6/2022 | Saber | H04W 72/23 |

OTHER PUBLICATIONS

International Search Report and Written Opinion—PCT/US2023/025174—ISA/EPO—Oct. 6, 2023.
(Continued)

*Primary Examiner* — Farid Seyedvosoghi
(74) *Attorney, Agent, or Firm* — QUALCOMM Incorporated

(57) ABSTRACT

Certain aspects of the present disclosure provide a method of wireless communications by a user equipment (UE), generally including receiving signaling of a configuration for semi-persistent scheduled (SPS) occasions for receiving physical downlink shared channels (PDSCHs), determining a number of PDSCHs to monitor for in an SPS occasion, and monitoring for PDSCHs in the SPS occasion, in accordance with the determination.

30 Claims, 13 Drawing Sheets

(56) References Cited

OTHER PUBLICATIONS

Qualcomm Incorporated: "Capacity Enhancement Techniques for XR", 3GPP TSG RAN WG1 #109-e, R1-2205056, 3rd Generation Partnership Project (3GPP), Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, XP052191717, pp. 1-11, XP052203904, Paragraph [0002]-[0004].

Qualcomm Incorporated: "Power Saving Techniques for XR", 3GPP TSG RAN WG1 #109-e, R1-2205054, 3rd Generation Partnership Project (3GPP), Mobile Competence Centre, 650, Route Des Lucioles, F-06921, Sophia-Antipolis Cedex, France, vol. RAN WG1, No. e-Meeting, May 9, 2022-May 20, 2022, Apr. 29, 2022, pp. 1-26, XP052203902, p. 4-5.

Nokia (Email Discussion Moderator): "New SID Study on XR Enhancements for NR", 3GPP TSG RAN Meeting #94e, RP-213587 (revision of RP-213558), Electronic Meeting, Dec. 6-17, 2021, 5 Pages.

\* cited by examiner

EXTENDED REALITY POWER SAVINGS ENHANCEMENTS

BACKGROUND

Field of the Disclosure

Aspects of the present disclosure relate to wireless communications, and more particularly, to techniques for saving power in applications involving wireless communications.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a user equipment (UE). The method includes receiving signaling of a configuration for semi-persistent scheduled (SPS) occasions for receiving physical downlink shared channels (PDSCHs); determining a number of PDSCHs to monitor for in an SPS occasion; and monitoring for PDSCHs in the SPS occasion, in accordance with the determination.

Another aspect provides a method of wireless communications by a network entity. The method includes transmitting signaling configuring a UE for SPS occasions for receiving PDSCHs; determining a number of PDSCHs the UE is to monitor for in an SPS occasion; and transmitting PDSCHs in the SPS occasion, in accordance with the determination.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
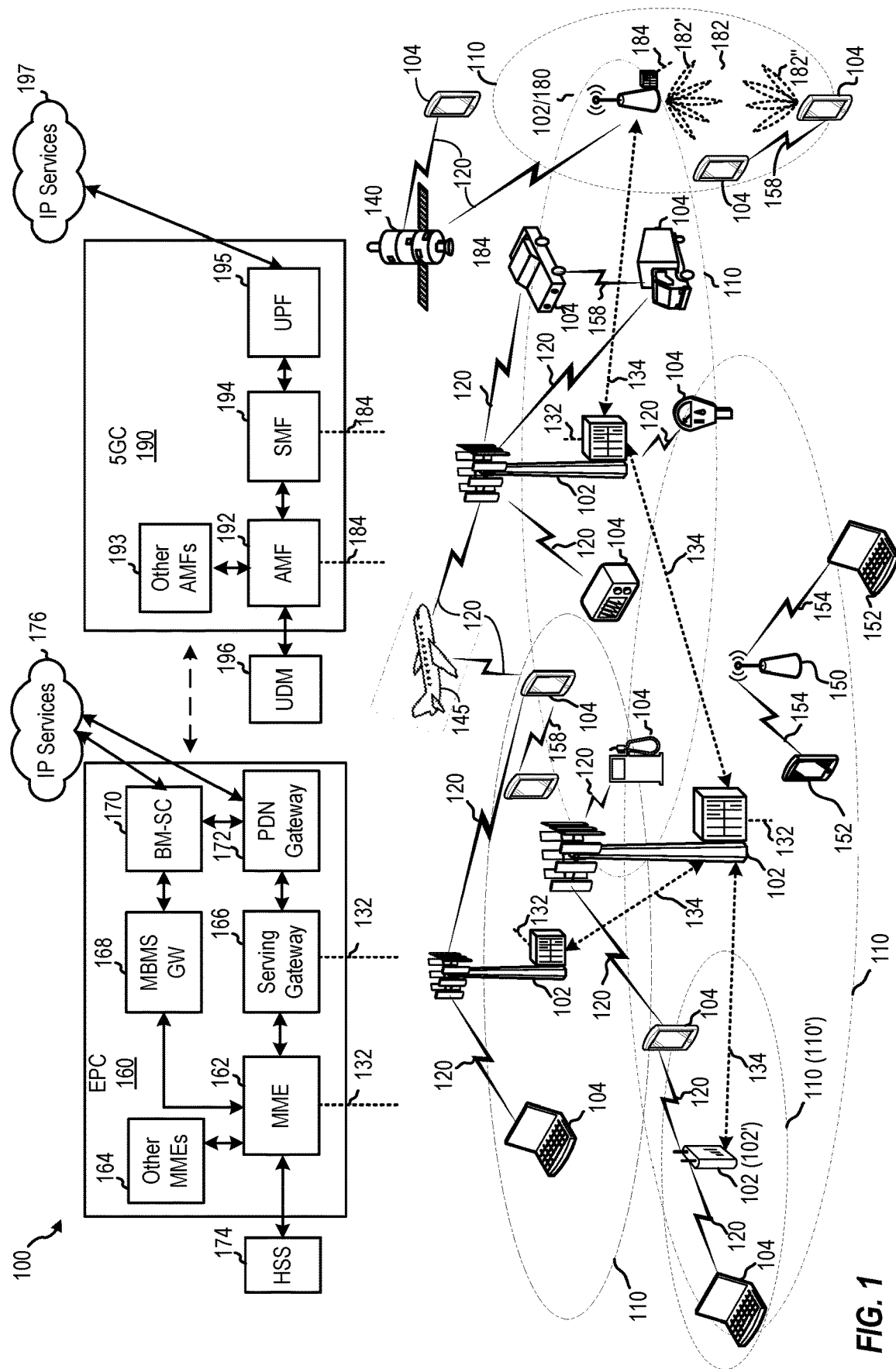
FIG. 1 depicts an example wireless communications network.

Aspects of the present disclosure provide apparatuses, methods, processing systems, and computer-readable mediums for saving power in applications involving wireless communications.

Various wireless devices, such as Internet of Things (IoT) and wearable devices have limited power sources. For example, smart glasses used for extended reality (XR) applications typically have small batteries (~200 mAhr typically) owing to their small form factor. As used herein, the term XR generally encompasses various technologies, such as augmented reality (AR) and virtual reality (VR). Because adding a bigger battery in XR wearables is often impractical, power saving is typically considered as an important area for XR designs.

One potential impact on power savings is how downlink traffic, such as multimedia traffic, is scheduled for transmission to a user equipment (UE) configured as an XR device. In some cases, scheduling information may be dynamically indicated, via downlink control information (DCI). In such cases, a network entity (e.g., a base station) may determine that data is available to be transmitted to or from a user equipment (UE), and the base station may transmit a scheduling indication (a dynamic grant) via a DCI conveyed in a physical downlink control channel (PDCCH) each time data is to be communicated. Such dynamic scheduling, however, may result in significant signaling overhead in the system, particularly when a large number of UEs receive small amounts of data frequently.

One mechanism to reduce this signaling overhead is semi-persistent scheduling (SPS), where a UE is configured with periodic resources for data transmissions, which may be activated and deactivated. When activated, a UE may begin decoding downlink traffic, sent via a physical downlink shared channel (PDSCH) on corresponding periodic resources. Unfortunately, current SPS is not optimized for XR. Further, PDSCH detection in the presence of jitter may consume additional power for a UE to detect the data arrival time, as the UE may periodically attempt to decode PDSCH, even when data is not transmitted during a given period. Further, the network may need to configure the amount of resource for a worst-case scenario, with the largest possible frame data size. This may result in over-allocation of resources to one UE, which may mean fewer resources for other UEs and reduced scheduling flexibility.

Aspects of the present disclosure, however, provide various mechanisms that may help enhance SPS based PDSCH scheduling for XR applications. As a result, power consumption may be reduced, resources may be allocated more efficiently, and overall user experience may be improved.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
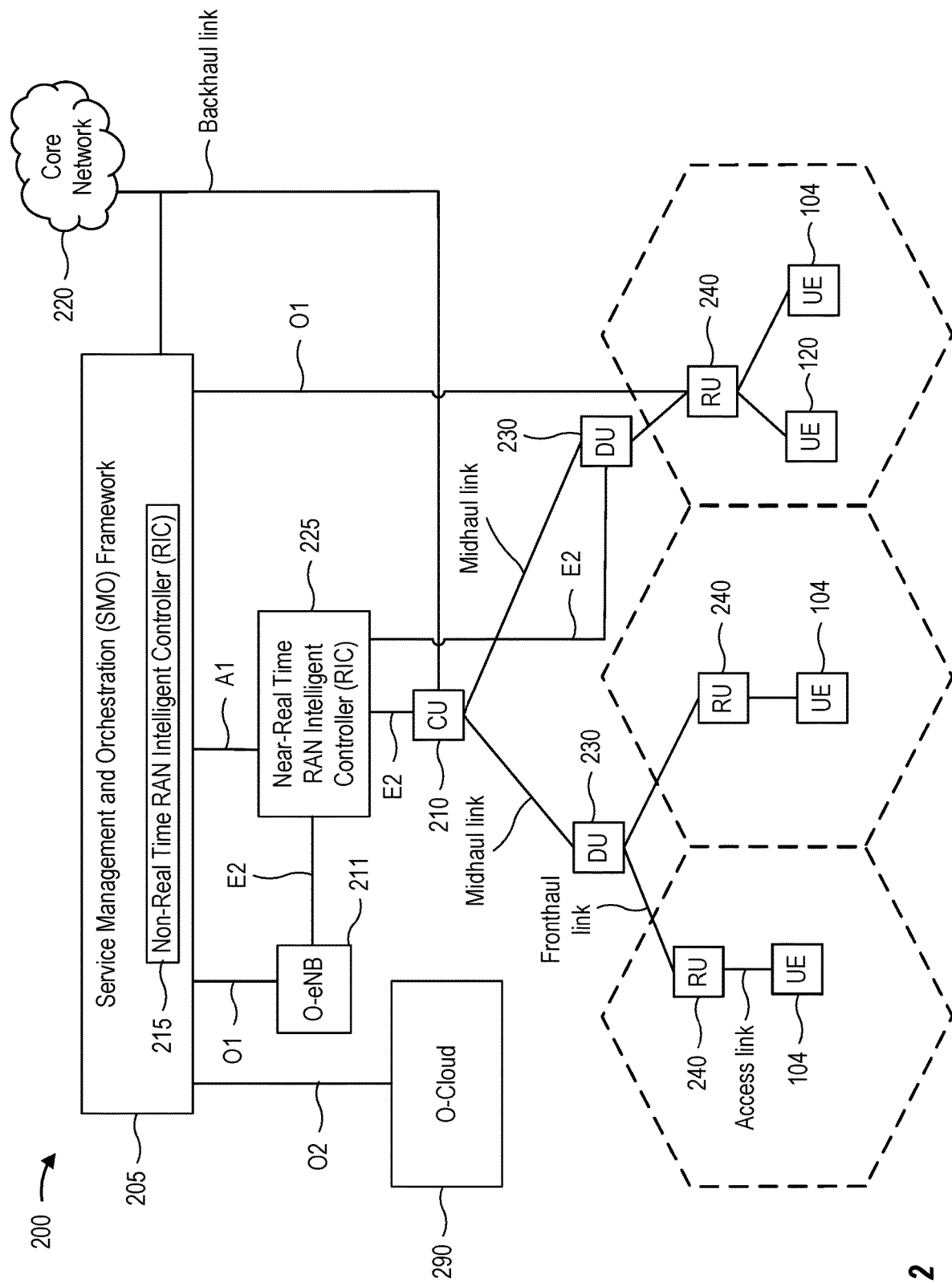
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5GNR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
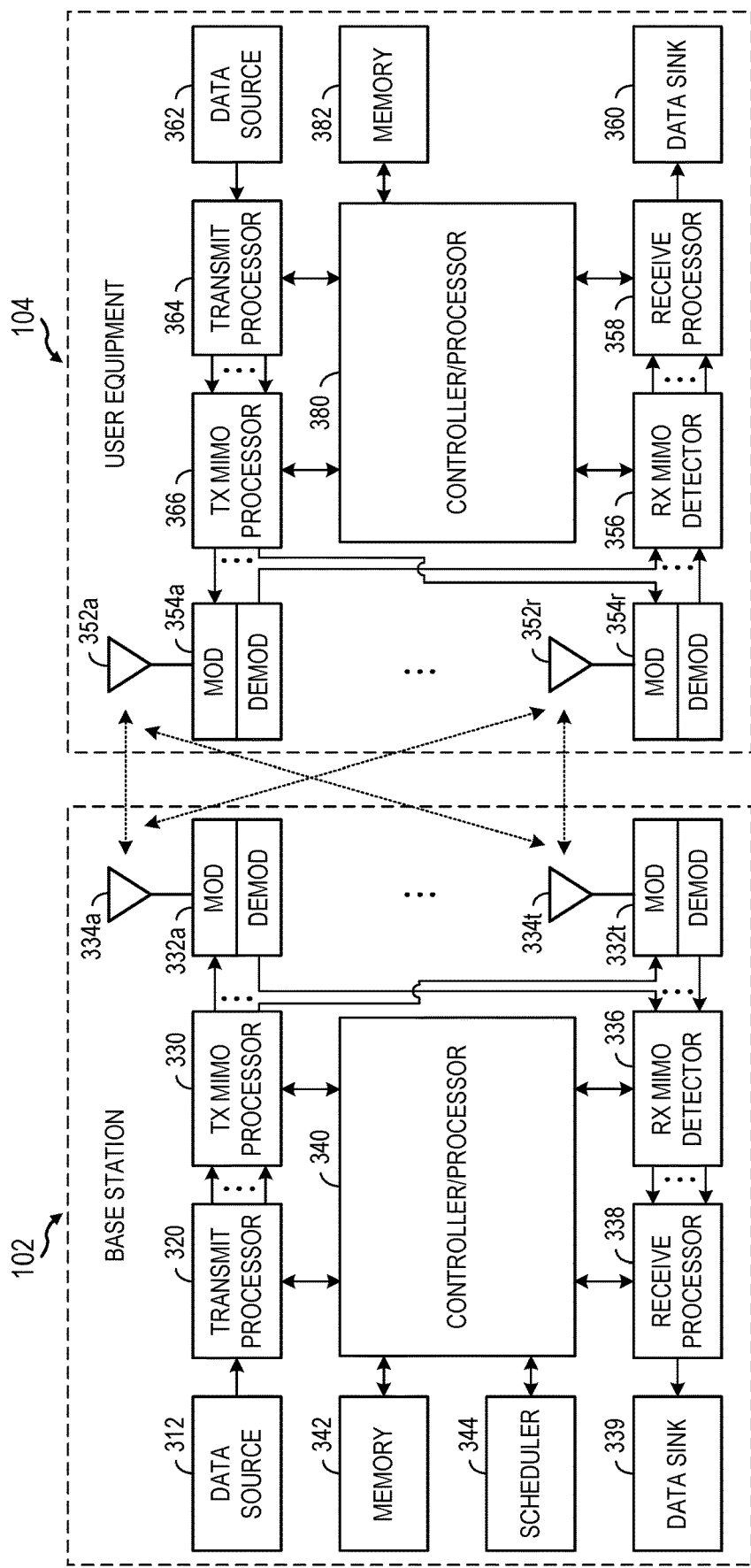
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
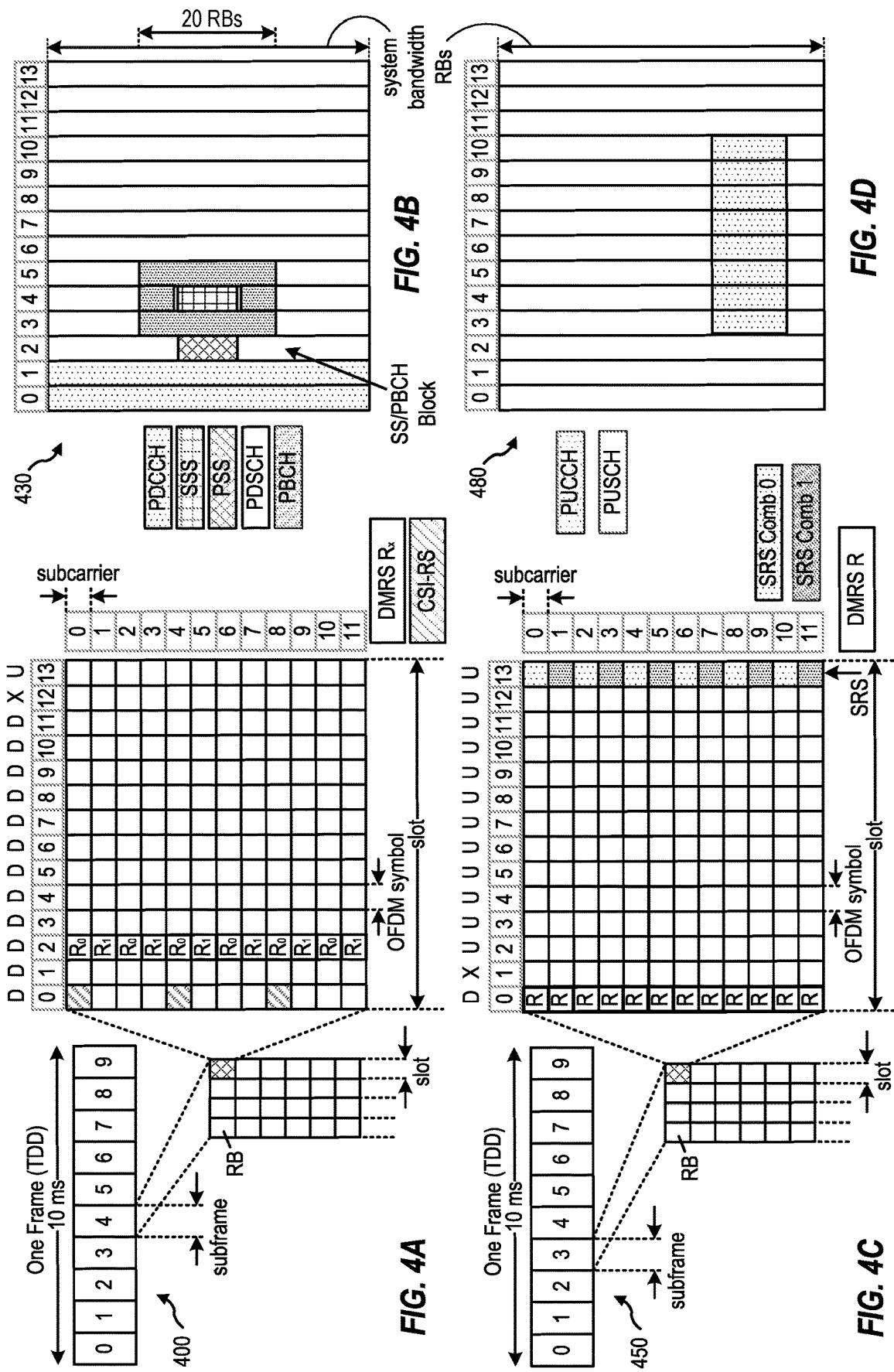
FIGS. 4A, 4B, 4C, and 4D depict various example aspects of data structures for a wireless communications network.

In particular, FIG. 4A is a diagram 400 illustrating an example of a first subframe within a 5G (e.g., 5GNR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2μ slots/subframe. The subcarrier spacing and symbol length/duration are a function of the numerology. The subcarrier spacing may be equal to 21×15 kHz, where is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Impact of Scheduling on Power Consumption

As noted above, one potential impact on power savings is how downlink traffic, such as multimedia traffic, is scheduled for transmission to a UE. Aspects of the present disclosure provide potential enchantments for semi-persistently scheduled (SPS) based downlink scheduling for XR use cases. The enhancements proposed herein may help save power while still being suitable for downlink (DL) traffic in periodic bursts, such as XR (media) frame data.

In some systems (e.g., NR Release-15) SPS-based scheduling may support radio resource control (RRC) pre-configuration of allocated resource, with PDCCH activation (e.g., via DCI format 1_0 or DCI format 1_1) and release (e.g., via DCI format 1_0). In other systems (e.g., NR Release-16), SPS-based scheduling may support multiple active SPS configurations (e.g., for different service types) and joint activation and release of multiple SPS configurations (e.g., with DCI format 1_2 for activation and DCI format 1_1/1_2 for release). In such systems, minimum SPS periodicity may be reduced to one slot.

XR traffic has various characteristics that may present challenges to conventional SPS-based scheduling. For example, XR traffic may be characterized by a mixture of pose and video traffic to or from an XR device (e.g., a headset). Such traffic may be characterized by bursty (quasiperiodic) packet arrival at different latencies (application jitter). As a result of this jittering effect, the arrival time for data bursts may be uncertain. In addition, XR video frames may have a variable data size depending on content of the video frame.

As noted above, current SPS-based scheduling techniques are not optimized for XR downlink traffic and may result in unnecessary power consumption. For example, PDSCH detection in the presence of jitter may consume additional power for the UE to detect the data arrival time. Further, the network may need to configure the amount of resource for the worst case with the largest possible frame data size.

Aspects of the present disclosure may help enhance downlink traffic scheduling with a hybrid approach that combines features of dynamic and SPS-based scheduling. In general, this hybrid scheduling may be jointly based on pre-configuration (as with SPS-based scheduling) and dynamic indication at configured occasions. The pre-configuration may indicate occasions where data can be scheduled based on SPS or a configured grant. In some cases, occasions can be at a relaxed periodicity (e.g., every 5 msec) relative to conventional SPS-based occasions. A DCI may include UE-specific information for one or multiple UEs. This may be similar to multi-cast scheduling mechanisms, but the data can be unicast (not shared between UEs). In some cases, the DCI may convey a limited subset of scheduling parameters that are dynamically assigned for each scheduled user in that configured occasion. The DCI may be conveyed in a PDCCH that can be decoded in lower complexity than for a regular PDCCH for dynamic scheduling. UEs may monitor compact for such a PDCCH at pre-configured occasions.

This hybrid scheduling approach may achieve a trade-off between PDCCH capacity, power consumption overhead, and scheduling flexibility. As will be described in greater detail below, multiple PDSCHs on one SPS occasion may be indicated by a single DCI. One DCI may indicate a number of slots with PDSCH for the video frame. Based on this indication, the UE may not have to monitor for PDCCH and PDSCH in remaining slots.

Figure 5:
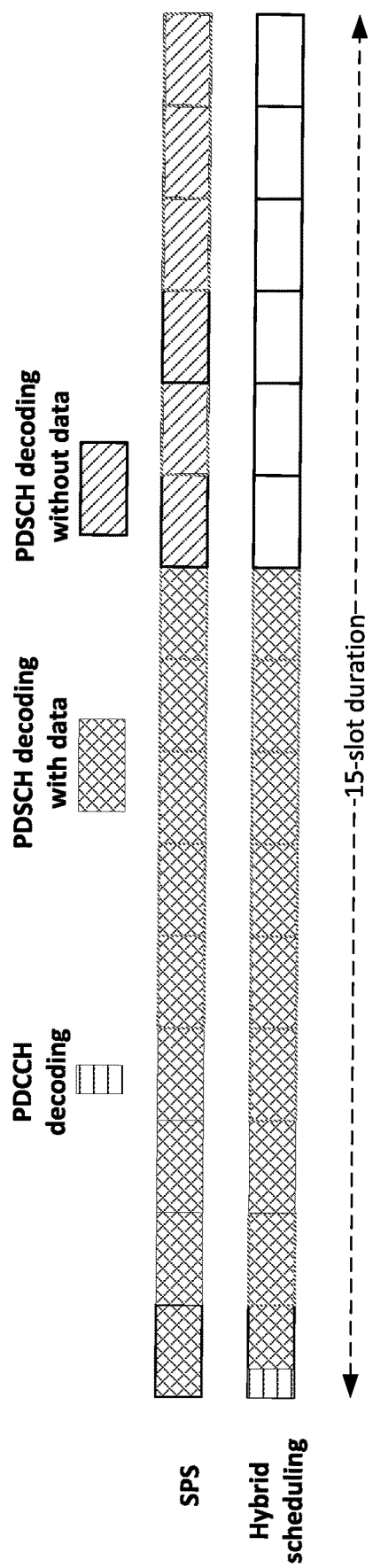
FIG. 5 depicts example timelines of physical downlink shared channel (PDSCH) scheduling.

Potential advantages of a hybrid scheduling approach over a conventional SPS-based approach are illustrated in FIG. 5. In the illustrated example, over a 15-slot duration, only 9 slots have PDSCH data to decode. Thus, for the SPS-based scheduling, the UE would waste power attempting to decode PDSCH in the remaining 6 slots, even though there is not data transmitted in these slots.

In the hybrid scheduling approach, a PDCCH at a beginning of the 15-slot duration may indicate the number of slots that actually have PDSCH to decode. As a result, the UE may save considerable amount of power by not attempting to decode PDSCH after the $9^{th}$ slot. For example, the hybrid scheduling may effectively improve UE power performance by up to 33% by avoiding unnecessary PDSCH decoding attempt in slots without data.

Figure 6:
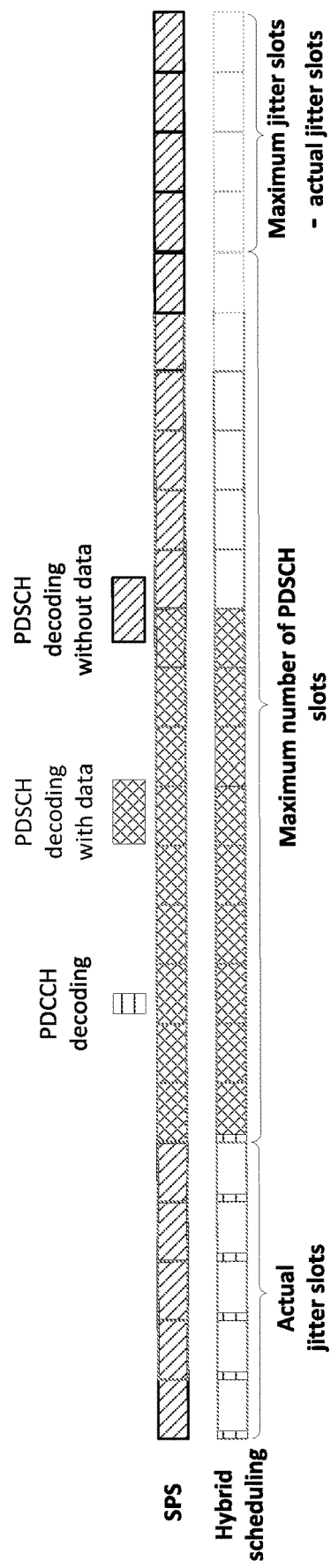
FIG. 6 depicts example timelines of PDSCH scheduling with jitter.

In the example shown in FIG. 5, the data arrives without jitter. Jitter may have a significant impact on performance, however. FIG. 6 illustrates an example that demonstrates the impact of jitter. As noted above, the network may need to configure the amount of resource for the worst case with the largest possible frame data size. In the illustrated example, the UE is configured with a maximum number of slots (15) for varying packet size and a maximum duration of jittering effect in the slots.

As illustrated, with SPS-based scheduling, the UE attempts to decode PDSCH in slots without data before the actual data arrival. Further, the UE continues to attempt PDSCH decoding through the remaining slots accounting for maximum jittering duration.

For hybrid scheduling, on the other hand, the UE may know when data is available and may avoid attempting PDSCH decoding prior to receiving an indication of XR data reception. For example, the UE may learn when the XR data actually arrives by decoding PDCCHs during configured occasions. When there is jitter, as in the example shown in FIG. 6, the potential power savings gain by hybrid scheduling may be increased. In some cases, based on network RRC configuration, a UE may stop the reception of XR data to save power, for example, after a maximum number of slots possible for a video frame has been processed. Such an early stop mechanism may be useful for the UE power saving for receiving XR DL traffic and may be used as an alternative to, or combined with, hybrid scheduling that dynamically indicates a start and length of data duration.

Aspects Related to Enhanced Scheduling for Potential Power Savings

As demonstrated above, scheduling mechanisms may have a significant impact on power consumption. Aspects of the present disclosure provide various mechanisms that may help enhance SPS based PDSCH scheduling for XR applications. For example, the mechanisms proposed herein may help increase the potential power savings gained through hybrid scheduling mechanisms.

Figure 7:
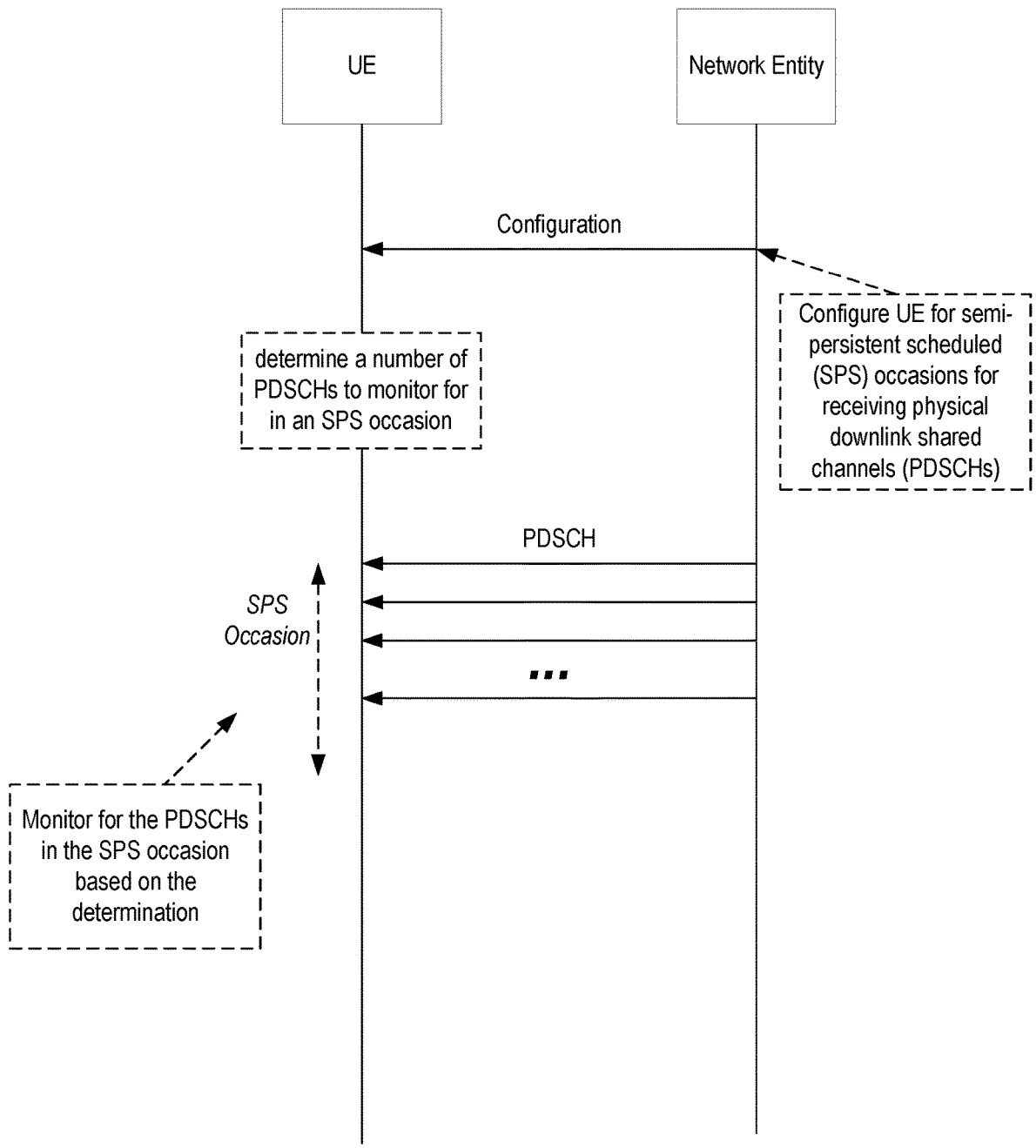
FIG. 7 depicts a call flow diagram for PDSCH scheduling, in accordance with aspects of the present disclosure.

The mechanisms proposed herein for enhanced PDSCH scheduling, for a UE, may be understood with reference to the call flow diagram 700 of FIG. 7.

As illustrated, the UE may receive, from a network entity (e.g., a gNB or node of a disaggregated base station), a configuration. The configuration may configure the UE with SPS occasions for receiving PDSCHs. The UE may determine a number of PDSCHs to monitor in an SPS occasion. Thus, rather than monitoring for all possible PDSCHs in the SPS occasion, the UE may only monitor for a limited number of PDSCHs, based on the determination. In this manner, processing the determined number of PDSCHs may effectively serve as an early stop for SPS, which may help reduce power consumption.

In some cases, the network may configure a maximum number of PDSCHs on each SPS occasion that the UE may receive. Based on this configuration, the UE can stop processing PDSCHs in the SPS occasion once it has processed the maximum number of PDSCHs.

In some cases, a configuration of this maximum number may be provided per SPS configuration. Configuration of this number can be provided in the RRC configuration of the SPS or by DCI (e.g., via the SPS activation DCI).

In some cases, the same time and frequency resource allocation may be applied to all PDSCHs on the SPS occasion (which simplifies processing and reduces signaling overhead). Periodicity and slot parameters in existing SPS configurations may be used to determine (within the SPS occasion) the slot for the first PDSCH of the PDSCHs. As an alternative (or in addition), the network may configure a slot pattern for the UE to receive PDSCHs. For example, a slot pattern may indicate a PDSCH could be received once every two slots. In some cases, if there is no explicit configuration is provided, the PDSCHs may be received in consecutive slots.

As noted above, hybrid scheduling that involves a combination of dynamic and SPS-base scheduling, can effectively handle jitter and can also dynamically indicate a number of PDSCHs to accommodate a variable XR traffic data size. In some cases, the start of the (media) frame data may be determined by the detection of a DCI. In some cases, the DCI may have a compact format (e.g., with a smaller payload than other DCI formats. In some cases, the compact DCI may be a non-scheduling DCI (e.g., that does not convey an UL or DL grant). This DCI may be conveyed in PDCCH or via a PDSCH (e.g., in additional padding bits). The DCI content may indicate the amount (number) of PDSCH transmissions for the XR frame, for a given SPS occasion.

In some approaches to hybrid scheduling, a wakeup signal (WUS) may be used. For example, a WUS may be used to signal a UE, in a connected discontinuous reception (CDRX) mode. A UE may be configured to monitor for a WUS, within a WUS monitoring window. If a WUS is detected, the UE may wake up to monitor for data transmissions. Otherwise, if no WUS is detected, the UE may return (or stay in) a low power state (e.g., until a subsequent WUS monitoring occasion).

Figure 8A:
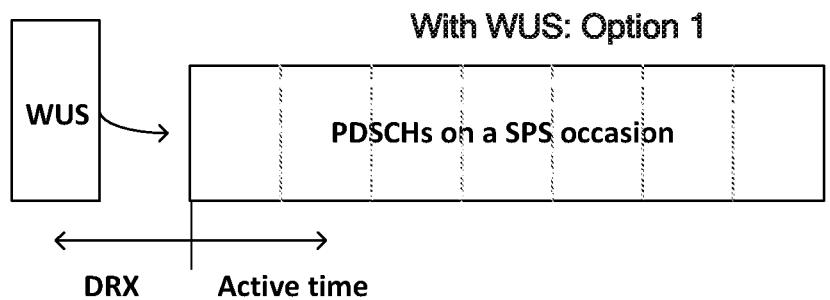
FIG. 8A, FIG. 8B, and FIG. 8C, depict example timelines of PDSCH scheduling, in accordance with aspects of the present disclosure.

FIG. 8A depicts one example timeline of hybrid PDSCH scheduling involving a WUS, in accordance with aspects of the present disclosure.

The example assumes the network has configured a UE with multiple PDCCH monitoring occasions in a WUS monitoring window to combat jitter. As illustrated, there may be a fixed offset from a PDCCH monitoring occasion (PMO) where a WUS is transmitted to the start of an active time (e.g., a CDRX On duration). This offset may provide sufficient time for the UE to prepare for processing during the active time. In some cases, the offset may be zero, if UE capability supports immediate processing. A zero offset may be beneficial, for example, by allowing the UE to meet latency requirements. The offset may be configured by the network.

In some cases, the WUS itself may indicate the number of PDSCHs in the SPS occasion. The UW may also indicate the delay to the start of the SPS occasion. There are various possible mechanisms to differentiate a WUS used for hybrid scheduling (e.g., from a WUS for non-XR UEs), to address different needs of UEs. For example, a WUS used for hybrid scheduling may be differentiated by a new radio network temporary identifier (RNTI) used to scramble a portion of the WUS. The WUS may also be differentiated by a different search space set (SSS), different DCI size, or different DCI aggregation levels for UEs that need to receive the XR traffic. Such UE types may be reported from UE to network or may be configured by network associated with other configurations for XR traffic.

Figure 8B:
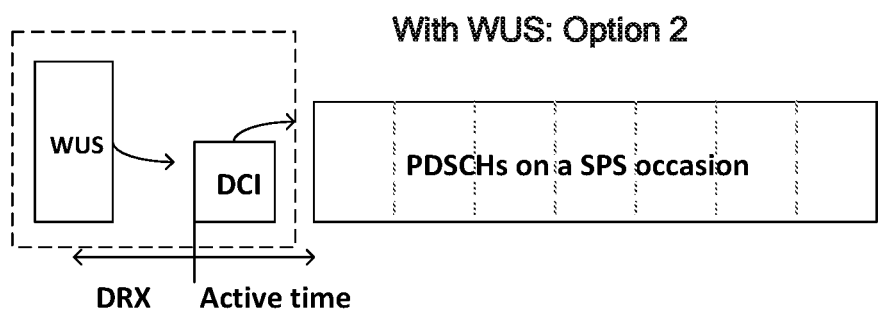

As illustrated in FIG. 8B, in some cases, at the beginning of the active time (after the UE wakes up as indicated by the WUS), the UE may monitor for a DCI indicating the number of transmitted PDSCHs in the SPS occasion and, possibly, a delay to the start of the SPS occasion. This DCI may help handle the variable traffic data size for UE power saving by indicating the number of transmitted PDSCHs on the SPS occasion. With this approach, the UE may only need to monitor the DCI once (or sparsely) as the data arrival time (with uncertainty due to jittering effect) is already indicated by the WUS PMO location where the WUS is detected.

Figure 8C:
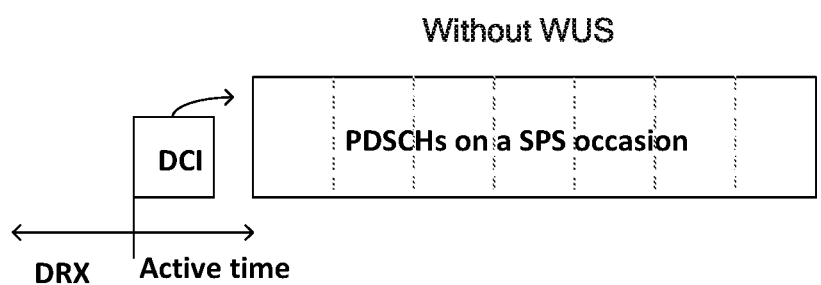

FIG. 8C depicts an example timeline of hybrid PDSCH scheduling without a WUS, in accordance with aspects of the present disclosure. In this example, the hybrid scheduling DCI is used to indicate the DL data transmission of multiple PDSCH occasions in the SPS occasion. In some cases, relatively dense PMOs may be configured for the UE to monitor for such a DCI (if conveyed in PDCCH), to detect the data arrival time in the presence of jitter. This (WUS-less) approach may assume that the UE can skip a CDRX wakeup if it does not detect the hybrid scheduling DCI. In this manner, if the network does not have XR data, as indicated by the DCI, the UE does not wake up (or remain awake).

In some cases, the UE may determine a hybrid automatic repeat request (HARQ) process ID configured for a first PDSCH of the PDSCHs to monitor for in the SPS occasion is determined based on one or more factors. For example, the HARQ ID may be determined by a slot number for the PDSCH transmission on the SPS occasion, based on a formula such as:

HARQ Process ID=[floor (CURRENT_slot×10/
(numberOfSlotsPerFrame×periodicity))]modulo
nrofHARQ-Processes,CURRENT_slot=[(SFN×
numberOfSlotsPerFrame)+slot number in the
frame].

In some cases, for the hybrid scheduling DCI, the HARQ process ID of the first PDSCH transmission (of the multiple PDSCH occasions in the SPS occasion) may be determined by a number of approaches. According to a first approach, the HARQ process ID may be determined by the slot number of the first PDSCH occasion according to the existing SPS HARQ ID process ID formula. According to a second approach, the HARQ process ID may be fixed value or a value configured by RRC message. According to a third approach, the HARQ process ID may be indicated by the DCI. Within an SPS occasion, the HARQ process ID may be incremented by one for each subsequent PDSCH occasion.

In some cases, the DCI may contain a HARQ ID skipping bitmap that indicates HARQ IDs that may be skipped. In such cases, the bitmap may have a bit for each HARQ ID assigned to the SPS (e.g., which may be determined by nrofHARQ-Processes), then the HARQ ID may be incremented by more than 1 for the next PDSCH occasion (if a HARQ ID is skipped). The skipped HARQ IDs may be used, for example, for the network to transmit retransmissions for PDSCHs determined (early) to have not been received successfully.

In some cases, the DCI may contain, for the number of PDSCHs, other information, such as a Redundancy version (RV) bitmap or a new data indication (NDI) bitmap. For example, such bitmaps may include one bit for a RV or NDI for each PDSCH occasion if only first retransmission is allowed for XR data (e.g., if a retransmission is associated with a fixed RV and there is no need to indicate the RV for a retransmission).

In some cases, XR arrival timing uncertainty (the jitter effect) may be considered as effectively similar to a random start of a channel occupancy time (COT) for channel access in unlicensed spectrum, such a NR unlicensed (NR-U). NR-U generally relies on SSS group (SSSG) switching to switch between mini-slot based PDCCH monitoring outside a COT and slot-based PDCCH monitoring within a COT. The shorter PDCCH monitoring periodicity outside the COT may be desirable, because waiting for the slot boundary has the risk of losing the medium (to another device). In such cases, a first SSSG (e.g., SSSG #0) may be used as a default for mini-slot based PDCCH monitoring.

Figure 9:
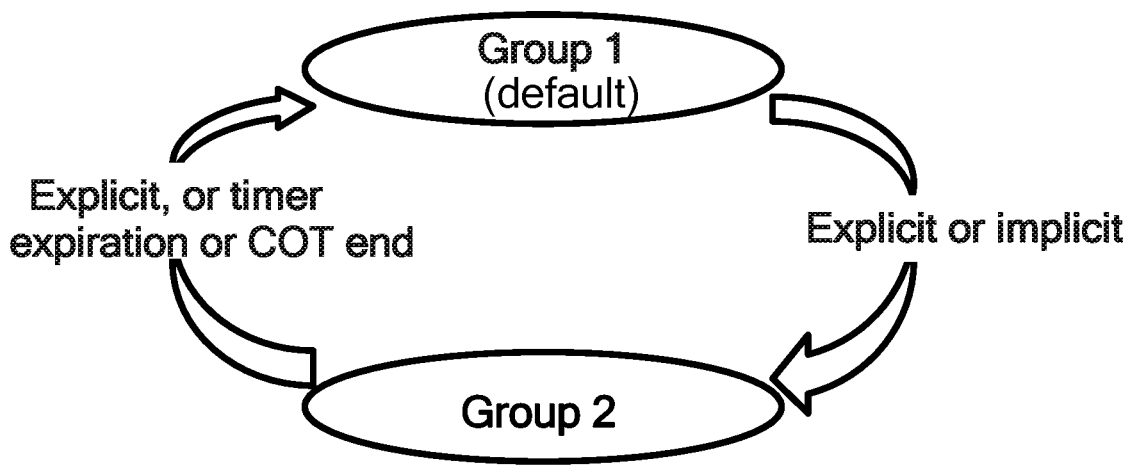
FIG. 9 depicts an example of search space set group (SSSG) switching, in accordance with aspects of the present disclosure.

As illustrated in FIG. 9, SSG switching from a default SSSG to another SSSG may be based on various conditions. For example, a switch to the second SSSG (SSSG #1) may be triggered by a bit (=1) in a DCI (e.g., DCI format 2) explicitly or via detection of a DCI format in the default SSSG (SSSG #0). The UE may return (switch back to the default SSSG (e.g., SSG #0) based on an explicit indication, timer expiration, or at an end of the COT.

In some cases, the SSSG switching mechanism may be extended to switch between different behaviors for PDCCH monitoring adaptation, for example, applicable to Type3-PDCCH common search space (CSS) and UE-specific search space (USS). Such behaviors may include, for example, PDCCH skipping and not skipping and SSSG switching between default group 0 and one of a group 1 and 2.

If the hybrid scheduling DCI is designed to indicate the number of upcoming PDSCHs for a SPS occasion (e.g., per FIG. 8B), a similar mechanism may be adopted. In such cases, the UE may enter the on duration (active time) to monitor the DCI for receiving XR data. Once this DCI is detected, the UE may stop monitoring this DCI for a duration and the UE monitors the PDSCH. In other words, it is possible UE does not need to monitor other unicast scheduling DCI within the duration.

In some cases, the hybrid scheduling DCI may enable SSSG switching or PDCCH skipping. In such cases, the SSSG switching time or PDCCH skipping time can be determined according to various options. For example, according to a first option, the time may be the same as the duration where UE monitors the PDSCH occasions for the SPS occasion and the DCI may indicate there is no PDCCH to receive in the DRX active time. According to a second option, the time may be configured by RRC. According to a third option, the time may be indicated by the DCI explicitly (e.g., with some number of bits). In some cases, for SSSG switching, monitoring of the hybrid scheduling DCI (in PDCCH) may be associated with one of the SSSGs (e.g., default SSSG #0).

Example Operations of a User Equipment

Figure 10:
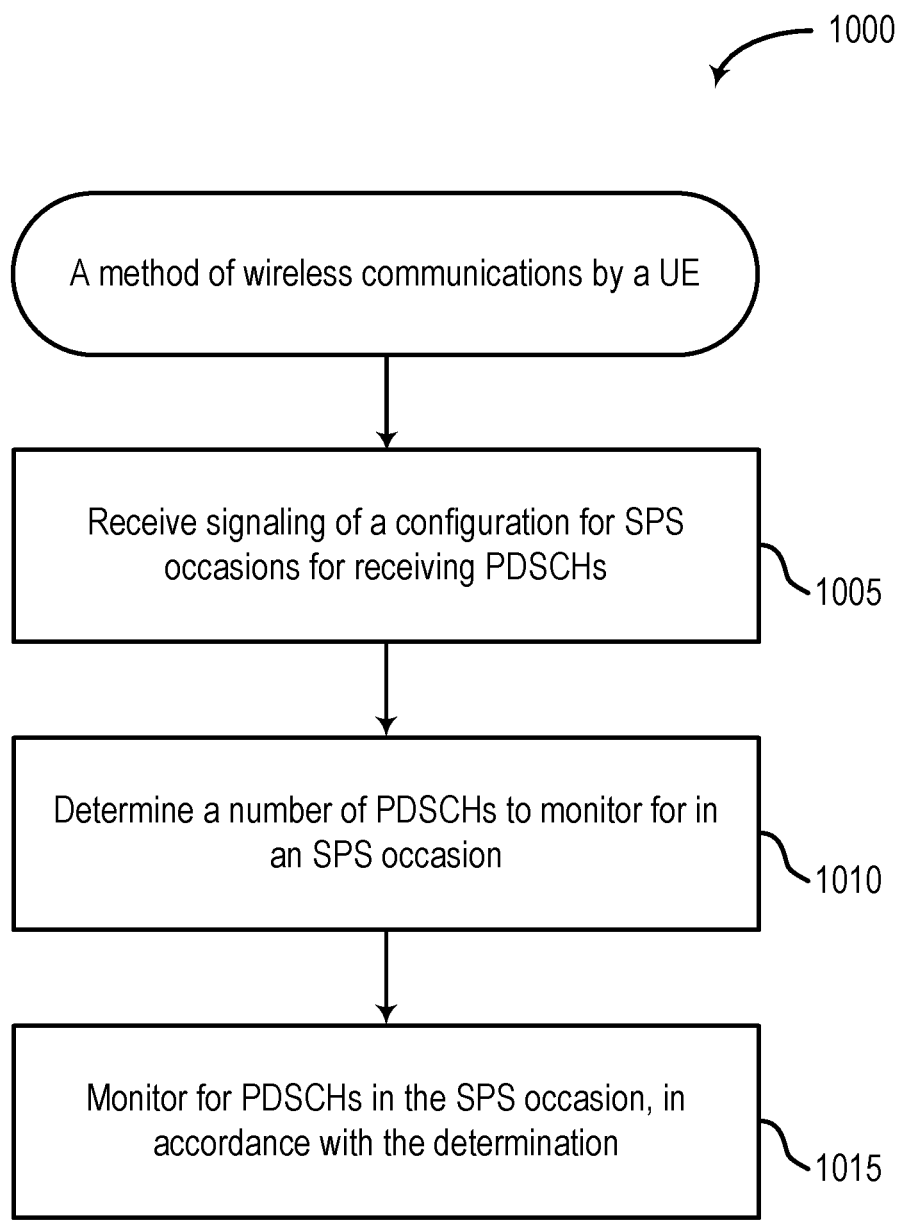
FIG. 10 depicts a method for wireless communications.

FIG. 10 shows an example of a method 1000 for wireless communications by a UE, such as UE 104 of FIGS. 1 and 3.

Method 1000 begins at step 1005 with receiving signaling of a configuration for SPS occasions for receiving PDSCHs. In some cases, the operations of this step refer to, or may be performed by, circuitry for receiving and/or code for receiving as described with reference to FIG. 12.

Method 1000 then proceeds to step 1010 with determining a number of PDSCHs to monitor for in an SPS occasion. In some cases, the operations of this step refer to, or may be performed by, circuitry for determining and/or code for determining as described with reference to FIG. 12.

Method 1000 then proceeds to step 1015 with monitoring for PDSCHs in the SPS occasion, in accordance with the determination. In some cases, the operations of this step refer to, or may be performed by, circuitry for monitoring and/or code for monitoring as described with reference to FIG. 12.

In some aspects, the method 1000 further includes receiving signaling indicating a maximum number of PDSCHs on each SPS occasion that the UE may expect to receive. In some cases, the operations of this step refer to, or may be performed by, circuitry for receiving and/or code for receiving as described with reference to FIG. 12.

In some aspects, the monitoring comprises: monitoring for PDSCHs until the maximum number of PDSCHs within the SPS occasion has been processed; and terminating monitoring within the SPS occasion after the maximum number of PDSCHs within the SPS occasion has been processed.

In some aspects, the maximum number of PDSCHs is signaled per SPS occasion.

In some aspects, the maximum number of PDSCHs is signaled via at least one of: the configuration for SPS occasions or DCI.

In some aspects, the configuration indicates a periodicity and slot parameters used to determine a slot to monitor for a first PDSCH of the number of PDSCHs.

In some aspects, the method 1000 further includes receiving signaling indicating a slot pattern for receiving the number of PDSCHs in the SPS occasion. In some cases, the operations of this step refer to, or may be performed by, circuitry for receiving and/or code for receiving as described with reference to FIG. 12.

In some aspects, the method 1000 further includes receiving signaling indicating configured occasions where data can be scheduled on the SPS occasions. In some cases, the operations of this step refer to, or may be performed by, circuitry for receiving and/or code for receiving as described with reference to FIG. 12.

In some aspects, the number of PDSCHs to monitor for in an SPS occasion is determined based on signaling received in or before one of the pre-configured occasions.

In some aspects, the configured occasions are within a WUS monitoring window.

In some aspects, a WUS indicates at least one of: the number of PDSCHs to monitor for in the SPS occasion; or a delay to a start of the SPS occasion.

In some aspects, the method 1000 further includes receiving a WUS that indicates transmission of a PDCCH in one of the configured occasions. In some cases, the operations of this step refer to, or may be performed by, circuitry for receiving and/or code for receiving as described with reference to FIG. 12.

In some aspects, the method 1000 further includes receiving the PDCCH indicated by the WUS, wherein the PDCCH indicates at least one of: the number of PDSCHs to monitor for in the SPS occasion; or a delay to a start of the SPS occasion. In some cases, the operations of this step refer to, or may be performed by, circuitry for receiving and/or code for receiving as described with reference to FIG. 12.

In some aspects, a PDCCH in one of the configured occasions indicates at least one of: the number of PDSCHs to monitor for in the SPS occasion; or a delay to a start of the SPS occasion and one or more PMOs are configured in the configured occasions for the UE to monitor a DCI.

In some aspects, a HARQ process ID configured for a first PDSCH of the PDSCHs to monitor for in the SPS occasion is determined based on: a slot number of the first PDSCH of the PDSCHs; a fixed value; or an indication in the DCI.

In some aspects, the DCI contains a bitmap indicating HARQ IDs that may be skipped.

In some aspects, the DCI contains, for the number of PDSCHs, at least one of: a RV bitmap; or a NDI bitmap.

In some aspects, the DCI indicates at least one of: SSSG switching; or PDCCH skipping.

In some aspects, timing for the SSSG switching or PDCCH skipping is based on at least one of: a duration where the UE monitors PDSCH within the SPS occasion; a RRC configuration; or an indication in the DCI.

Figure 12:
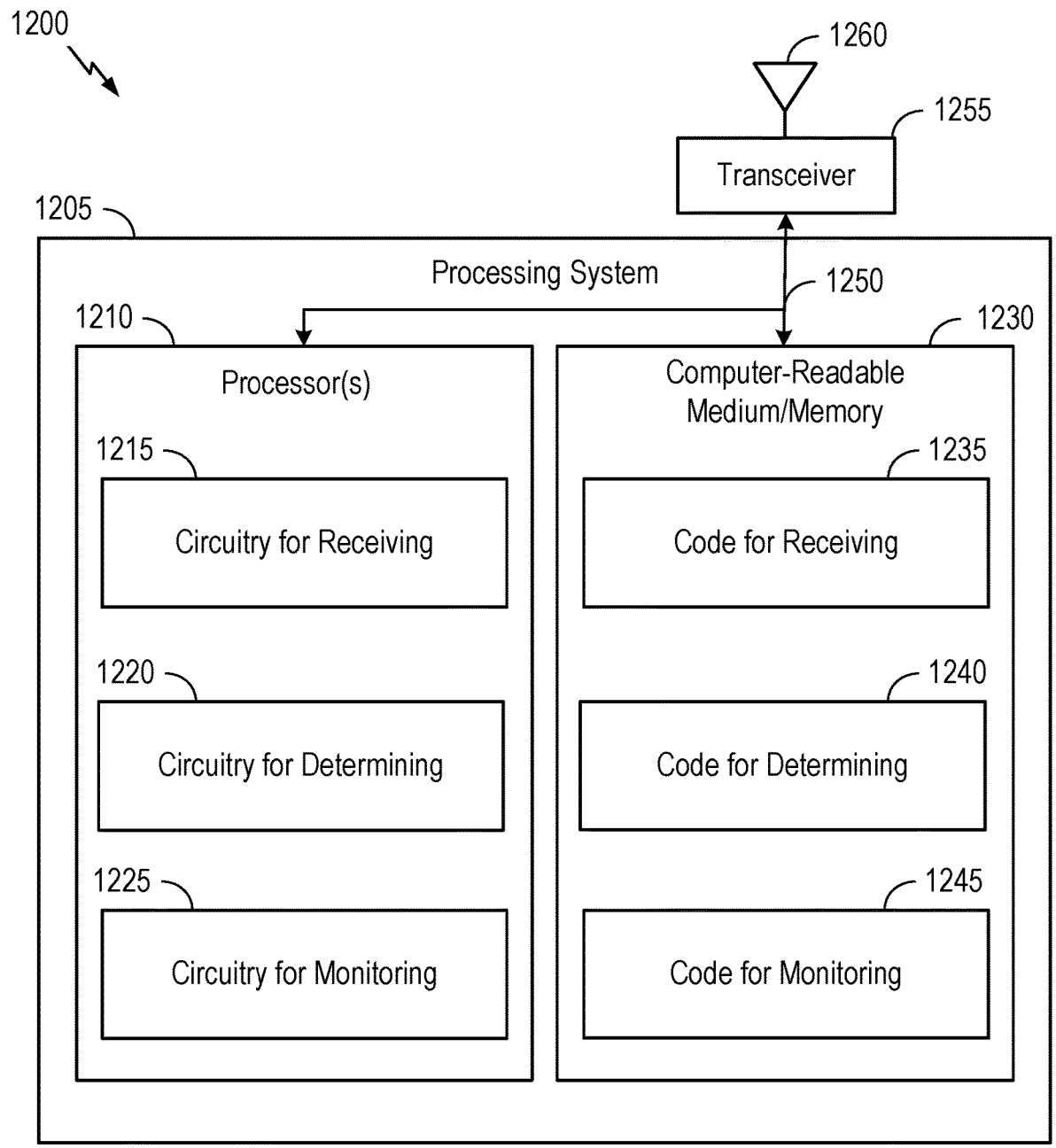
FIG. 12 depicts aspects of an example communications device.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

Example Operations of a Network Entity

Figure 11:
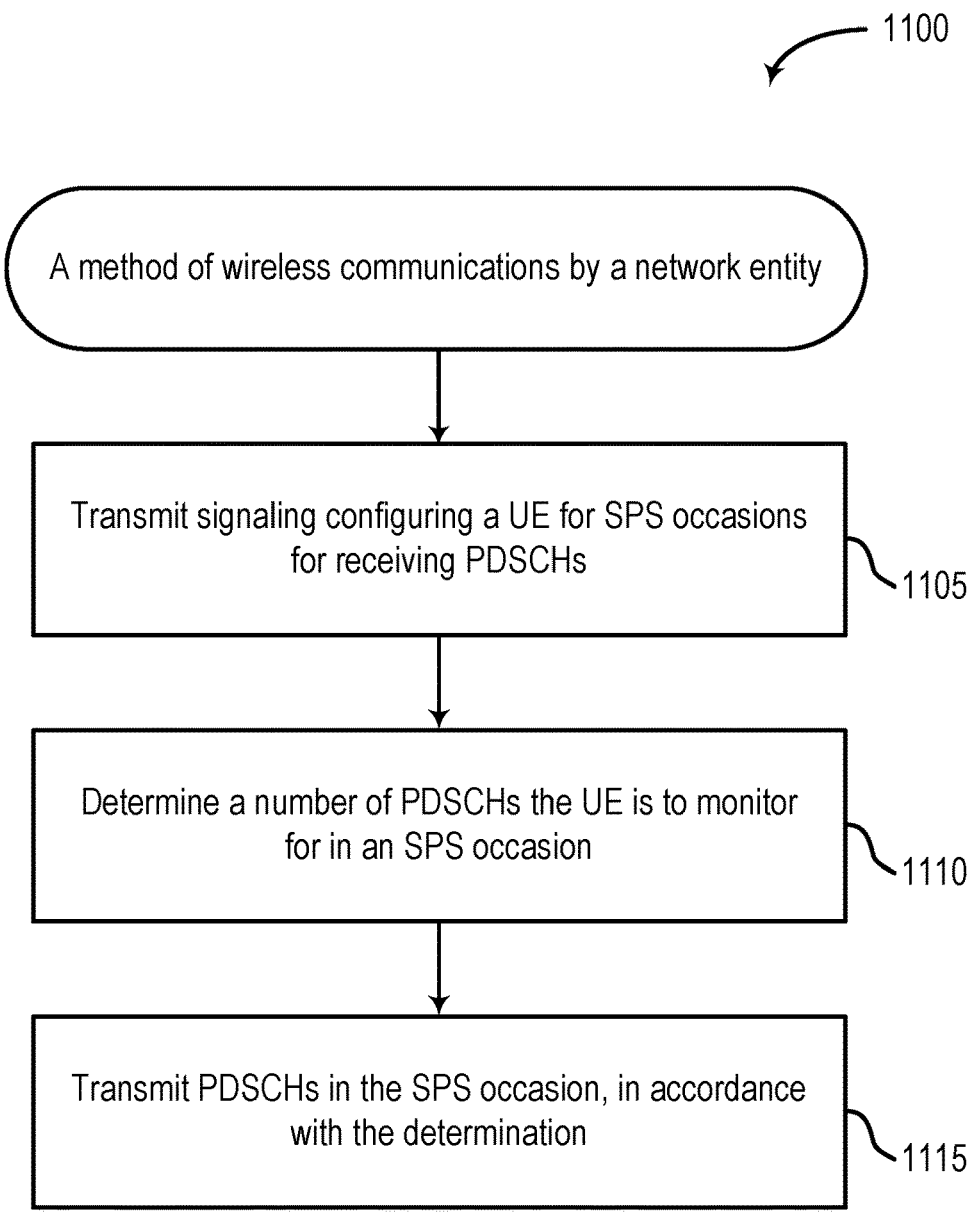
FIG. 11 depicts a method for wireless communications.

FIG. 11 shows an example of a method 1100 for wireless communications by a network entity, such as BS 102 of FIGS. 1 and 3, or a disaggregated base station as discussed with respect to FIG. 2.

Method 1100 begins at step 1105 with transmitting signaling configuring a UE for SPS occasions for receiving PDSCHs. In some cases, the operations of this step refer to, or may be performed by, circuitry for transmitting and/or code for transmitting as described with reference to FIG. 13.

Method 1100 then proceeds to step 1110 with determining a number of PDSCHs the UE is to monitor for in an SPS occasion. In some cases, the operations of this step refer to, or may be performed by, circuitry for determining and/or code for determining as described with reference to FIG. 13.

Method 1100 then proceeds to step 1115 with transmitting PDSCHs in the SPS occasion, in accordance with the determination. In some cases, the operations of this step refer to, or may be performed by, circuitry for transmitting and/or code for transmitting as described with reference to FIG. 13.

In some aspects, the method 1100 further includes transmitting signaling indicating a maximum number of PDSCHs on each SPS occasion that the UE may expect to receive. In some cases, the operations of this step refer to, or may be performed by, circuitry for transmitting and/or code for transmitting as described with reference to FIG. 13.

In some aspects, the transmitting comprises: transmitting PDSCHs until the maximum number of PDSCHs within the SPS occasion has been processed.

In some aspects, the maximum number of PDSCHs is signaled per SPS occasion.

In some aspects, the maximum number of PDSCHs is signaled via at least one of: the configuration for SPS occasions or DCI.

In some aspects, the configuration indicates a periodicity and slot parameters used to determine a slot to monitor for a first PDSCH of the number of PDSCHs.

In some aspects, the method 1100 further includes transmitting signaling indicating a slot pattern for receiving the number of PDSCHs in the SPS occasion. In some cases, the operations of this step refer to, or may be performed by, circuitry for transmitting and/or code for transmitting as described with reference to FIG. 13.

In some aspects, the method 1100 further includes transmitting signaling indicating configured occasions where data can be scheduled on the SPS occasions. In some cases, the operations of this step refer to, or may be performed by, circuitry for transmitting and/or code for transmitting as described with reference to FIG. 13.

In some aspects, the number of PDSCHs to monitor for in an SPS occasion is determined based on signaling received in or before one of the pre-configured occasions.

In some aspects, the configured occasions are within a WUS monitoring window.

In some aspects, a WUS indicates at least one of: the number of PDSCHs the UE is to monitor for in the SPS occasion; or a delay to a start of the SPS occasion.

In some aspects, the method 1100 further includes receiving a WUS that indicates transmission of a PDCCH in one of the configured occasions. In some cases, the operations of this step refer to, or may be performed by, circuitry for receiving and/or code for receiving as described with reference to FIG. 13.

In some aspects, the method 1100 further includes transmitting the PDCCH indicated by the WUS, wherein the PDCCH indicates at least one of: the number of PDSCHs the UE is to monitor for in the SPS occasion; or a delay to a start of the SPS occasion. In some cases, the operations of this step refer to, or may be performed by, circuitry for transmitting and/or code for transmitting as described with reference to FIG. 13.

In some aspects, a PDCCH in one of the configured occasions indicates at least one of: the number of PDSCHs the UE is to monitor for in the SPS occasion; or a delay to a start of the SPS occasion and one or more PMOs are configured in the configured occasions for the UE to monitor a DCI.

In some aspects, a HARQ process ID configured for a first PDSCH of the PDSCHs to monitor for in the SPS occasion is determined based on: a slot number of the first PDSCH of the PDSCHs; a fixed value; or an indication in the DCI.

In some aspects, the DCI contains a bitmap indicating HARQ IDs that may be skipped.

In some aspects, the DCI contains, for the number of PDSCHs, at least one of: a RV bitmap; or a NDI bitmap.

In some aspects, the DCI indicates at least one of: SSSG switching; or PDCCH skipping.

In some aspects, timing for the SSSG switching or PDCCH skipping is based on at least one of: a duration where the UE monitors PDSCH within the SPS occasion; a RRC configuration; or an indication in the DCI.

Figure 13:
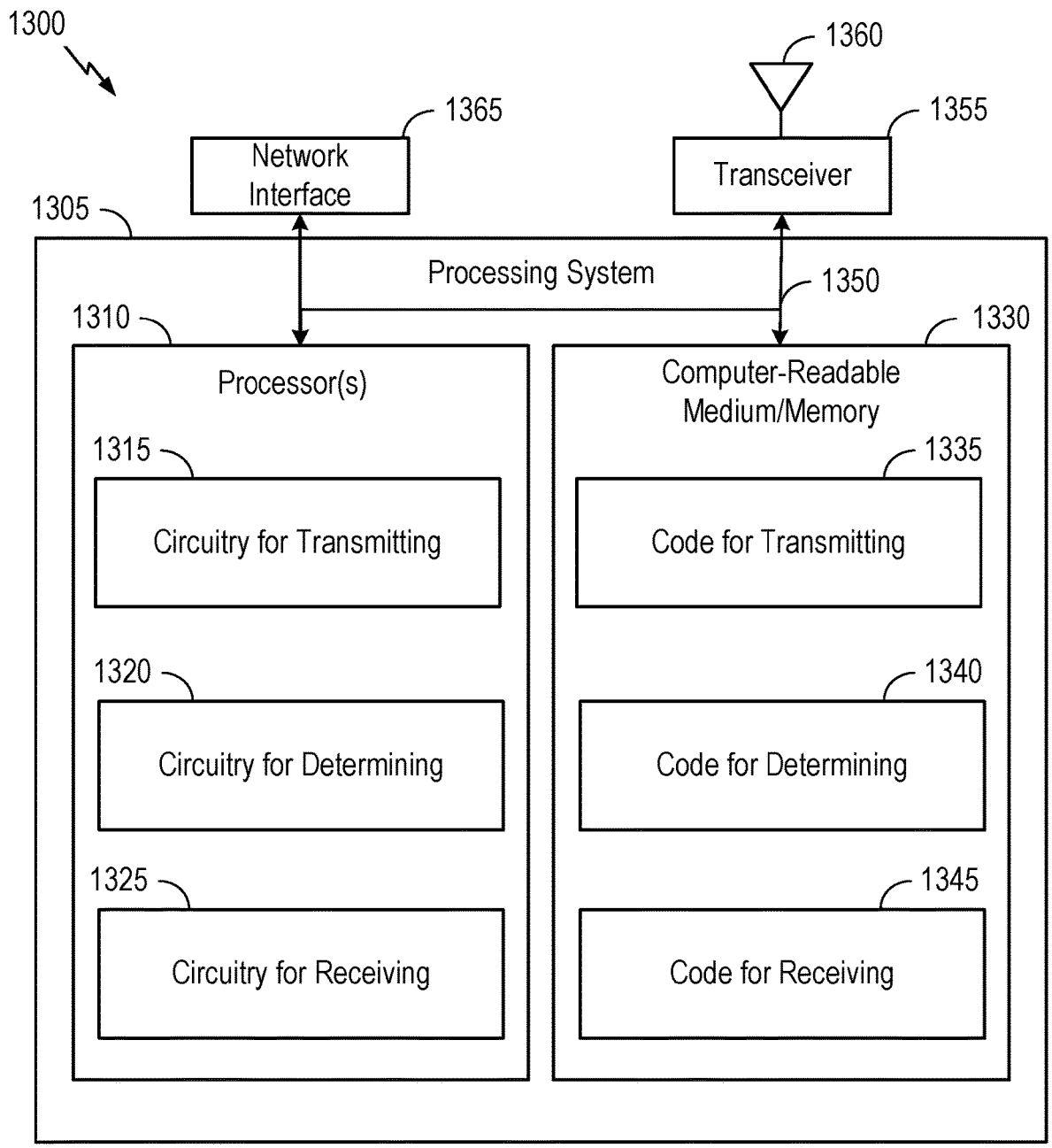
FIG. 13 depicts aspects of an example communications device.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Example Communications Devices

FIG. 12 depicts aspects of an example communications device 1200. In some aspects, communications device 1200 is a user equipment, such as UE 104 described above with respect to FIGS. 1 and 3.

The communications device 1200 includes a processing system 1205 coupled to the transceiver 1255 (e.g., a transmitter and/or a receiver). The transceiver 1255 is configured to transmit and receive signals for the communications device 1200 via the antenna 1260, such as the various signals as described herein. The processing system 1205 may be configured to perform processing functions for the communications device 1200, including processing signals received and/or to be transmitted by the communications device 1200.

The processing system 1205 includes one or more processors 1210. In various aspects, the one or more processors 1210 may be representative of one or more of receive processor 358, transmit processor 364, TX MIMO processor 366, and/or controller/processor 380, as described with respect to FIG. 3. The one or more processors 1210 are coupled to a computer-readable medium/memory 1230 via a bus 1250. In certain aspects, the computer-readable medium/memory 1230 is configured to store instructions (e.g., computer-executable code) that when executed by the one or more processors 1210, cause the one or more processors 1210 to perform the method 1000 described with respect to FIG. 10, or any aspect related to it. Note that reference to a processor performing a function of communications device 1200 may include one or more processors 1210 performing that function of communications device 1200.

In the depicted example, computer-readable medium/memory 1230 stores code (e.g., executable instructions), such as code for receiving 1235, code for determining 1240, and code for monitoring 1245. Processing of the code for receiving 1235, code for determining 1240, and code for monitoring 1245 may cause the communications device 1200 to perform the method 1000 described with respect to FIG. 10, or any aspect related to it.

The one or more processors 1210 include circuitry configured to implement (e.g., execute) the code stored in the computer-readable medium/memory 1230, including circuitry such as circuitry for receiving 1215, circuitry for determining 1220, and circuitry for monitoring 1225. Processing with circuitry for receiving 1215, circuitry for determining 1220, and circuitry for monitoring 1225 may cause the communications device 1200 to perform the method 1000 described with respect to FIG. 10, or any aspect related to it.

Various components of the communications device 1200 may provide means for performing the method 1000 described with respect to FIG. 10, or any aspect related to it. For example, means for transmitting, sending or outputting for transmission may include transceivers 354 and/or antenna(s) 352 of the UE 104 illustrated in FIG. 3 and/or the transceiver 1255 and the antenna 1260 of the communications device 1200 in FIG. 12. Means for receiving or obtaining may include transceivers 354 and/or antenna(s) 352 of the UE 104 illustrated in FIG. 3 and/or the transceiver 1255 and the antenna 1260 of the communications device 1200 in FIG. 12.

FIG. 13 depicts aspects of an example communications device 1300. In some aspects, communications device 1300 is a network entity, such as BS 102 of FIGS. 1 and 3, or a disaggregated base station as discussed with respect to FIG. 2.

The communications device 1300 includes a processing system 1305 coupled to the transceiver 1355 (e.g., a transmitter and/or a receiver) and/or a network interface 1365. The transceiver 1355 is configured to transmit and receive signals for the communications device 1300 via the antenna 1360, such as the various signals as described herein. The network interface 1365 is configured to obtain and send signals for the communications device 1300 via communication link(s), such as a backhaul link, midhaul link, and/or fronthaul link as described herein, such as with respect to FIG. 2. The processing system 1305 may be configured to perform processing functions for the communications device 1300, including processing signals received and/or to be transmitted by the communications device 1300.

The processing system 1305 includes one or more processors 1310. In various aspects, one or more processors 1310 may be representative of one or more of receive processor 338, transmit processor 320, TX MIMO processor 330, and/or controller/processor 340, as described with respect to FIG. 3. The one or more processors 1310 are coupled to a computer-readable medium/memory 1330 via a bus 1350. In certain aspects, the computer-readable medium/memory 1330 is configured to store instructions (e.g., computer-executable code) that when executed by the one or more processors 1310, cause the one or more processors 1310 to perform the method 1100 described with respect to FIG. 11, or any aspect related to it. Note that reference to a processor of communications device 1300 performing a function may include one or more processors 1310 of communications device 1300 performing that function.

In the depicted example, the computer-readable medium/memory 1330 stores code (e.g., executable instructions), such as code for transmitting 1335, code for determining 1340, and code for receiving 1345. Processing of the code for transmitting 1335, code for determining 1340, and code for receiving 1345 may cause the communications device 1300 to perform the method 1100 described with respect to FIG. 11, or any aspect related to it.

The one or more processors 1310 include circuitry configured to implement (e.g., execute) the code stored in the computer-readable medium/memory 1330, including circuitry such as circuitry for transmitting 1315, circuitry for determining 1320, and circuitry for receiving 1325. Processing with circuitry for transmitting 1315, circuitry for determining 1320, and circuitry for receiving 1325 may cause the communications device 1300 to perform the method 1100 as described with respect to FIG. 11, or any aspect related to it.

Various components of the communications device 1300 may provide means for performing the method 1100 as described with respect to FIG. 11, or any aspect related to it. Means for transmitting, sending or outputting for transmission may include transceivers 332 and/or antenna(s) 334 of the BS 102 illustrated in FIG. 3 and/or the transceiver 1355 and the antenna 1360 of the communications device 1300 in FIG. 13. Means for receiving or obtaining may include transceivers 332 and/or antenna(s) 334 of the BS 102 illustrated in FIG. 3 and/or the transceiver 1355 and the antenna 1360 of the communications device 1300 in FIG. 13.

Example Clauses

Implementation examples are described in the following numbered clauses:

Clause 1: A method for wireless communications by a UE, comprising: receiving signaling of a configuration for SPS occasions for receiving PDSCHs; determining a number of PDSCHs to monitor for in an SPS occasion; and monitoring for PDSCHs in the SPS occasion, in accordance with the determination.

Clause 2: The method of Clause 1, further comprising: receiving signaling indicating a maximum number of PDSCHs on each SPS occasion that the UE may expect to receive.

Clause 3: The method of Clause 2, wherein the monitoring comprises: monitoring for PDSCHs until the maximum number of PDSCHs within the SPS occasion has been processed; and terminating monitoring within the SPS occasion after the maximum number of PDSCHs within the SPS occasion has been processed.

Clause 4: The method of Clause 2, wherein the maximum number of PDSCHs is signaled per SPS occasion.

Clause 5: The method of Clause 2, wherein the maximum number of PDSCHs is signaled via at least one of: the configuration for SPS occasions or DCI.

Clause 6: The method of Clause 2, wherein the configuration indicates a periodicity and slot parameters used to determine a slot to monitor for a first PDSCH of the number of PDSCHs.

Clause 7: The method of Clause 2, further comprising: receiving signaling indicating a slot pattern for receiving the number of PDSCHs in the SPS occasion.

Clause 8: The method of any one of Clauses 1-7, further comprising: receiving signaling indicating configured occasions where data can be scheduled on the SPS occasions; and the number of PDSCHs to monitor for in an SPS occasion is determined based on signaling received in or before one of the pre-configured occasions.

Clause 9: The method of Clause 8, wherein the configured occasions are within a WUS monitoring window.

Clause 10: The method of Clause 9, wherein a WUS indicates at least one of: the number of PDSCHs to monitor for in the SPS occasion; or a delay to a start of the SPS occasion.

Clause 11: The method of Clause 9, further comprising: receiving a WUS that indicates transmission of a PDCCH in one of the configured occasions; and receiving the PDCCH indicated by the WUS, wherein the PDCCH indicates at least one of: the number of PDSCHs to monitor for in the SPS occasion; or a delay to a start of the SPS occasion.

Clause 12: The method of Clause 8, wherein a PDCCH in one of the configured occasions indicates at least one of: the number of PDSCHs to monitor for in the SPS occasion; or a delay to a start of the SPS occasion and one or more PMOs are configured in the configured occasions for the UE to monitor a DCI.

Clause 13: The method of Clause 12, wherein a HARQ process ID configured for a first PDSCH of the PDSCHs to monitor for in the SPS occasion is determined based on: a slot number of the first PDSCH of the PDSCHs; a fixed value; or an indication in the DCI.

Clause 14: The method of Clause 13, wherein the DCI contains a bitmap indicating HARQ IDs that may be skipped.

Clause 15: The method of Clause 13, wherein the DCI contains, for the number of PDSCHs, at least one of: a RV bitmap; or a NDI bitmap.

Clause 16: The method of Clause 12, wherein the DCI indicates at least one of: SSSG switching; or PDCCH skipping.

Clause 17: The method of Clause 16, wherein timing for the SSSG switching or PDCCH skipping is based on at least one of: a duration where the UE monitors PDSCH within the SPS occasion; a RRC configuration; or an indication in the DCI.

Clause 18: A method of wireless communications by a network entity, comprising: transmitting signaling configuring a UE for SPS occasions for receiving PDSCHs; determining a number of PDSCHs the UE is to monitor for in an SPS occasion; and transmitting PDSCHs in the SPS occasion, in accordance with the determination.

Clause 19: The method of Clause 18, further comprising: transmitting signaling indicating a maximum number of PDSCHs on each SPS occasion that the UE may expect to receive.

Clause 20: The method of Clause 19, wherein the transmitting comprises: transmitting PDSCHs until the maximum number of PDSCHs within the SPS occasion has been processed.

Clause 21: The method of Clause 19, wherein the maximum number of PDSCHs is signaled per SPS occasion.

Clause 22: The method of Clause 19, wherein the maximum number of PDSCHs is signaled via at least one of: the configuration for SPS occasions or DCI.

Clause 23: The method of Clause 19, wherein the configuration indicates a periodicity and slot parameters used to determine a slot to monitor for a first PDSCH of the number of PDSCHs.

Clause 24: The method of Clause 19, further comprising: transmitting signaling indicating a slot pattern for receiving the number of PDSCHs in the SPS occasion.

Clause 25: The method of any one of Clauses 18-24, further comprising: transmitting signaling indicating config-ured occasions where data can be scheduled on the SPS occasions; and the number of PDSCHs to monitor for in an SPS occasion is determined based on signaling received in or before one of the pre-configured occasions.

Clause 26: The method of Clause 25, wherein the configured occasions are within a WUS monitoring window.

Clause 27: The method of Clause 26, wherein a WUS indicates at least one of: the number of PDSCHs the UE is to monitor for in the SPS occasion; or a delay to a start of the SPS occasion.

Clause 28: The method of Clause 26, further comprising: receiving a WUS that indicates transmission of a PDCCH in one of the configured occasions; and transmitting the PDCCH indicated by the WUS, wherein the PDCCH indicates at least one of: the number of PDSCHs the UE is to monitor for in the SPS occasion; or a delay to a start of the SPS occasion.

Clause 29: The method of Clause 25, wherein a PDCCH in one of the configured occasions indicates at least one of: the number of PDSCHs the UE is to monitor for in the SPS occasion; or a delay to a start of the SPS occasion and one or more PMOs are configured in the configured occasions for the UE to monitor a DCI.

Clause 30: The method of Clause 29, wherein a HARQ process ID configured for a first PDSCH of the PDSCHs to monitor for in the SPS occasion is determined based on: a slot number of the first PDSCH of the PDSCHs; a fixed value; or an indication in the DCI.

Clause 31: The method of Clause 30, wherein the DCI contains a bitmap indicating HARQ IDs that may be skipped.

Clause 32: The method of Clause 30, wherein the DCI contains, for the number of PDSCHs, at least one of: a RV bitmap; or a NDI bitmap.

Clause 33: The method of Clause 29, wherein the DCI indicates at least one of: SSSG switching; or PDCCH skipping.

Clause 34: The method of Clause 33, wherein timing for the SSSG switching or PDCCH skipping is based on at least one of: a duration where the UE monitors PDSCH within the SPS occasion; a RRC configuration; or an indication in the DCI.

Clause 35: An apparatus, comprising: a memory comprising executable instructions; and a processor configured to execute the executable instructions and cause the apparatus to perform a method in accordance with any one of Clauses 1-34.

Clause 36: An apparatus, comprising means for performing a method in accordance with any one of Clauses 1-34.

Clause 37: A non-transitory computer-readable medium comprising executable instructions that, when executed by a processor of an apparatus, cause the apparatus to perform a method in accordance with any one of Clauses 1-34.

Clause 38: A computer program product embodied on a computer-readable storage medium comprising code for performing a method in accordance with any one of Clauses 1-34.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communications by a user equipment (UE), comprising:
    receiving signaling of a configuration for semi-persistent scheduled (SPS) occasions for receiving physical downlink shared channels (PDSCHs);
    receiving signaling indicating a maximum number of PDSCHs on each SPS occasion of the SPS occasions that the UE may expect to receive;
    determining a number of PDSCHs to monitor for in each SPS occasion of the SPS occasions in accordance with the maximum number of PDSCHs; and
    monitoring for PDSCHs in the SPS occasion, in accordance with the determination and the configuration for SPS occasions.

2. The method of claim 1, wherein the monitoring comprises:
    monitoring for PDSCHs until the maximum number of PDSCHs within each SPS occasion of the SPS occasions has been processed; and
    terminating monitoring within each SPS occasion of the SPS occasions after the maximum number of PDSCHs within each SPS occasion of the SPS occasions has been processed.

3. The method of claim 1, wherein the maximum number of PDSCHs is signaled per SPS occasion.

4. The method of claim 1, wherein the maximum number of PDSCHs is signaled via at least one of: the configuration for SPS occasions or downlink control information (DCI).

5. The method of claim 1, wherein the configuration indicates a periodicity and slot parameters used to determine a slot to monitor for a first PDSCH of the number of PDSCHs.

6. The method of claim 1, further comprising receiving signaling indicating a slot pattern for receiving the number of PDSCHs in each SPS occasion of the SPS occasions.

7. A method of wireless communications by a user equipment (UE), comprising:
    receiving signaling of a configuration for semi-persistent scheduled (SPS) occasions for receiving physical downlink shared channels (PDSCHs);
    receiving signaling, in or before one of the SPS occasions, indicating configured occasions where data can be scheduled on the one of the SPS occasions; and
    determining a number of PDSCHs to monitor for in the one of the SPS occasions based on the signaling received in or before the one of the SPS occasions; and
    monitoring for PDSCHs in the SPS occasions, in accordance with the determination.

8. The method of claim 7, wherein the configured occasions are within a wakeup signal (WUS) monitoring window.

9. The method of claim 8, wherein the signaling in or before the one of the SPS occasions includes a WUS indicating at least one of:

the number of PDSCHs to monitor for in the one of the SPS occasions; or a delay to a start of the one of the SPS occasions.

10. The method of claim 8, further comprising:
receiving a WUS that indicates transmission of a physical downlink control channel (PDCCH) in one of the configured occasions; and
receiving the PDCCH indicated by the WUS, wherein the PDCCH indicates at least one of:
the number of PDSCHs to monitor for in the one of the SPS occasions; or
a delay to a start of the one of the SPS occasions.

11. The method of claim 7, wherein a physical downlink control channel (PDCCH) in one of the configured occasions indicates at least one of:
the number of PDSCHs to monitor for in the one of the SPS occasions; or
a delay to a start of the one of the SPS occasions, one or more physical downlink control channel (PDCCH) monitoring occasions (PMOs) being configured in the configured occasions for the UE to monitor for a downlink control information (DCI).

12. The method of claim 11, wherein a hybrid automatic repeat request (HARQ) process ID configured for a first PDSCH of the PDSCHs to monitor for in the one of the SPS occasions is determined based on:
a slot number of the first PDSCH of the PDSCHs;
a fixed value; or
an indication in the DCI.

13. The method of claim 12, wherein the DCI contains a bitmap indicating HARQ IDs that may be skipped.

14. The method of claim 12, wherein the DCI contains, for the number of PDSCHs, at least one of:
a redundancy version (RV) bitmap; or
a new data indication (NDI) bitmap.

15. The method of claim 11, wherein the DCI indicates at least one of:
search space set group (SSSG) switching; or
PDCCH skipping.

16. The method of claim 15, wherein timing for the SSSG switching or PDCCH skipping is based on at least one of:
a duration where the UE monitors for PDSCH within the one of the SPS occasions;
a radio resource control (RRC) configuration; or
an indication in the DCI.

17. A method of wireless communications by a network entity, comprising:
transmitting signaling configuring a user equipment (UE) for semi-persistent scheduled (SPS) occasions for receiving physical downlink shared channels (PDSCHs);
transmitting signaling indicating a maximum number of PDSCHs on each SPS occasion of the SPS occasions that the UE may expect to receive;
determining a number of PDSCHs the UE is to monitor for in each SPS occasion of the SPS occasions in accordance with the maximum number of PDSCHs; and
transmitting PDSCHs in the SPS occasion, in accordance with the determination and the configuration for SPS occasions.

18. The method of claim 17, wherein the transmitting comprises:
transmitting PDSCHs until the maximum number of PDSCHs within each SPS occasion of the SPS occasions has been processed.

19. The method of claim 17, wherein the maximum number of PDSCHs is signaled per SPS occasion.

20. The method of claim 17, wherein the maximum number of PDSCHs is signaled via at least one of: the configuration for SPS occasions or downlink control information (DCI).

21. The method of claim 17, wherein the configuration indicates a periodicity and slot parameters used to determine a slot to monitor for a first PDSCH of the number of PDSCHs.

22. The method of claim 17, further comprising transmitting signaling indicating a slot pattern for receiving the number of PDSCHs in the SPS occasion.

23. A method of wireless communications by a network entity, comprising:
transmitting signaling configuring a user equipment (UE) for semi-persistent scheduled (SPS) occasions for receiving physical downlink shared channels (PDSCHs);
transmitting signaling, in or before one of the SPS occasions, indicating configured occasions where data can be scheduled on the one of the SPS occasions;
determining a number of PDSCHs the UE is to monitor for in an SPS occasion based on the signaling received in or before the one of the SPS occasions; and
transmitting PDSCHs in the SPS occasion, in accordance with the determination.

24. The method of claim 23, wherein the configured occasions are within a wakeup signal (WUS) monitoring window.

25. The method of claim 23, wherein a physical downlink control channel (PDCCH) in one of the configured occasions indicates at least one of:
the number of PDSCHs the UE is to monitor for in the one of the SPS occasions; or
a delay to a start of the one of the SPS occasions, one or more physical downlink control channel (PDCCH) monitoring occasions (PMOs) being configured in the configured occasions for the UE to monitor a downlink control information (DCI).

26. The method of claim 25, wherein the DCI indicates at least one of:
search space set group (SSSG) switching; or
PDCCH skipping.

27. A user equipment (UE) configured for wireless communication, comprising: a memory comprising computer-executable instructions; and one or more processors configured to execute the computer-executable instructions and cause the UE to:
receive signaling of a configuration for semi-persistent scheduled (SPS) occasions for receiving physical downlink shared channels (PDSCHs), wherein the signaling indicates a maximum number of PDSCHs on each SPS occasion of the SPS occasions that the UE may expect to receive;
determine a number of PDSCHs to monitor for in each SPS occasion of the SPS occasions in accordance with the maximum number of PDSCHs; and
monitor for PDSCHs in the SPS occasion, in accordance with the determination and the configuration for SPS occasions.

28. A network entity configured for wireless communication, comprising: a memory comprising computer-executable instructions; and one or more processors configured to execute the computer-executable instructions and cause the network entity to:

transmit signaling configuring a user equipment (UE) for semi-persistent scheduled (SPS) occasions for receiving physical downlink shared channels (PDSCHs);

transmitting signaling indicating a maximum number of PDSCHs on each SPS occasion of the SPS occasions that the UE may expect to receive;

determine a number of PDSCHs the UE is to monitor for in each SPS occasion of the SPS occasions in accordance with the maximum number of PDSCHs; and transmit PDSCHs in the SPS occasion, in accordance with the determination and the configuration for SPS occasions.

29. A user equipment (UE) configured for wireless communication, comprising: a memory comprising computer-executable instructions; and one or more processors configured to execute the computer-executable instructions and cause the UE to:

receive signaling of a configuration for semi-persistent scheduled (SPS) occasions for receiving physical downlink shared channels (PDSCHs);

receive signaling, in or before one of the SPS occasions, indicating configured occasions where data can be scheduled on the one of the SPS occasions; and determine a number of PDSCHs to monitor for in the one of the SPS occasions based on the signaling received in or before the one of the SPS occasions; and monitor for PDSCHs in the SPS occasions, in accordance with the determination.

30. A network entity configured for wireless communication, comprising: a memory comprising computer-executable instructions; and one or more processors configured to execute the computer-executable instructions and cause the network entity to:

transmit signaling configuring a user equipment (UE) for semi-persistent scheduled (SPS) occasions for receiving physical downlink shared channels (PDSCHs);

transmit signaling, in or before one of the SPS occasions, indicating configured occasions where data can be scheduled on the one of the SPS occasions;

determine a number of PDSCHs the UE is to monitor for in an SPS occasion based on the signaling received in or before the one of the SPS occasions; and transmit PDSCHs in the SPS occasion, in accordance with the determination.

* * * * *